July 24, 1962   M. A. POLSTER   3,046,520
ULTRASONIC VEHICLE DETECTION SYSTEM
Filed Jan. 25, 1960   5 Sheets-Sheet 2

INVENTOR.
M.A. POLSTER
BY
HIS ATTORNEY

July 24, 1962 M. A. POLSTER 3,046,520
ULTRASONIC VEHICLE DETECTION SYSTEM
Filed Jan. 25, 1960 5 Sheets-Sheet 3

INVENTOR.
M. A. POLSTER
BY
HIS ATTORNEY

FIG. 6.

July 24, 1962   M. A. POLSTER   3,046,520
ULTRASONIC VEHICLE DETECTION SYSTEM
Filed Jan. 25, 1960   5 Sheets-Sheet 5

FIG. 7

WAVEFORM DIAGRAMS FOR FIG. 6.

VEHICLE MOVING "OUT"

VEHICLE MOVING "IN"

- VOLTAGE AT POINT B
- VOLTAGE AT POINT C'
- VOLTAGE AT POINT D'
- VOLTAGE AT POINT E'
- VOLTAGE AT POINT F'
- VOLTAGE AT POINT G'
- VOLTAGE AT POINT H'
- OPERATION OF RELAY R2
- OPERATION OF RELAY R3

INVENTOR.
M. A. POLSTER
BY
HIS ATTORNEY

United States Patent Office 3,046,520
Patented July 24, 1962

3,046,520
ULTRASONIC VEHICLE DETECTION SYSTEM
Morton A. Polster, Rochester, N.Y., assignor to General
Railway Signal Company, Rochester, N.Y.
Filed Jan. 25, 1960, Ser. No. 4,483
12 Claims. (Cl. 340—39)

This invention relates to the detection of objects and particularly vehicles, and especially pertains to such systems wherein the objects are vehicles detected as a result of the effects they produce as they intercept a beam of sound energy. This invention is analogous in subject matter to and is to be regarded as being in the nature of an improvement over what is disclosed in the prior applications of H. C. Kendall et al., Ser. No. 808,736 filed April 24, 1959; J. H. Auer, Jr., Ser. No. 820,325, filed June 15, 1959; and my prior applications, Ser. No. 845,810, filed October 12, 1959; and Ser. No. 849,326, filed October 28, 1959, all of which are assigned to the assignee of the present invention.

It is a common characteristic of the various systems disclosed in these prior applications that a beam of repetitive sound pulses is transmitted by transmitting means including a sound transducer across the path of the objects or vehicles. A receiver which includes a receiving transducer is also provided, and this receiving transducer is so positioned and directed that it receives and is responsive to the transmitted sound energy upon its reflection from the sound reflecting surfaces of the object or vehicle as it intercepts the transmitted sound beam. In these prior systems, the repetition rate of the transmitted sound pulses is made sufficienly slow to permit each sound pulse to be received by the receiving means following its reflection from an object or vehicle within the designated detection zone prior to the transmission of the next sound pulse. This requirement eliminates ambiguities since it relates each reflection pulse definitely to the last-transmitted pulse. Electronic gating circuit means are employed in some of these systems to demarcate an interval following the transmission of each sound pulse during which reflections of such pulse may be expected at the receiving transducer by an object or vehicle within the detection zone. The gating circuits render the receiving circuits responsive to receive sound pulses only throughout the demarcated interval, and thereby provide time-gating discrimination against reflections which might be received either from various extraneous surfaces or from vehicles other than within the designated detection zone. In some of these prior systems, the beam of sound pulses is directed vertically downward toward the pavement so that, in the absence of any vehicle, reflection pulses are received from the pavement and these are blocked only as a vehicle intercepts the beam. The time-gating discrimination provided by the gating circuits makes it readily possible to discriminate between these pavement reflections and the vehicle reflections.

In my prior application, Ser. No. 849,326 referred to above I have disclosed a system having certain important operating characteristics. One of these is that it permits use of the maximum repetition rate of the repetitive sound pulses when a vehicle is within the sound beam while still observing the requirement previously mentioned that each echo pulse from a vehicle must be received by the receiving transducer before the next sound pulse is transmitted. Another characteristic of this system disclosed in my application, Ser. No. 849,326 is that there is no need for electronic time gating circuits to discriminate between the vehicle reflection pulses and other reflections. Rather, in such system, successive sound pulses are transmitted at a predetermined slow rate when no reflection pulses are being received. This slow rate is selected so that the period between successive pulses exceeds the round-trip propagation time of a pulse from the transmitting transducer to an object to be detected when at its maximum range and thence back to the receiving transducer. When any vehicle intercepts the sound beam, a reflection pulse from such vehicle is received by the receiving transducer before the transmitting means would ordinarily transmit the next pulse. Each received reflection pulse acts on the transmitting means to cause another pulse to be transmitted. As a result, any such vehicle produces an increase in the frequency at which successive pulses are transmitted. As is disclosed in detail in such prior application, the sound pulse repetition rate may be utilized to give an indication of vehicle presence.

In this system of my prior application, Ser. No. 849,326 and as well in the other applications above mentioned, there is no way in which the apparatus can distinguish between vehicles traveling in different directions other than by the use of two sets of equipment disposed along the line of travel. In effect, two different sound beams must be directed across the path of travel of each vehicle, and the order in which these sound beams are interrupted by the vehicle provides an indication as to the direction of its travel. Such a system is disclosed in the system of the N. A. Bolton application, Ser. No. 820,225, filed June 15, 1959. Although this use of two separate sound beams has been considered to be a minimum requirement to provide directional information, I have found that the desired results may be obtained with the use of only a single sound beam. Moreover, I have found that with my invention which uses a single sound beam it is also possible to obtain information as to the speed of each vehicle passing through the sound beam.

Described briefly, the present invention utilizes in part the principle of the invention disclosed in my prior application, Ser. No. 849,326 in that each sound pulse reflected from the vehicle as it enters the sound beam is used to trigger the transmission of the next pulse. However, whereas in the prior application, Ser. No. 849,326 the sound pulse beam is shown as being transmitted generally transverse to the direction of travel of the vehicles, in this invention I purposely aim the beam of pulses at an oblique angle to such direction of travel. Also, the sound beam is caused to be "spread" along the direction of movement of the vehicles so that each vehicle does not quickly pass through the beam but instead at least a portion of such vehicle remains within the beam as the vehicle moves some distance along the roadway. An electronic pulse oscillator generates successive sound pulses with a period, when no vehicle is present in the beam, which is at least as long as the round trip propagation time of a sound pulse from the transmitting transducer to a vehicle at maximum range and back to a receiving transducer. When a vehicle enters the beam, each reflected pulse triggers the transmitting apparatus to send a new pulse so that pulses are generated at a more rapid rate. As a vehicle proceeds in the direction opposite to that of the transmitted pulses, the round-trip propagation time becomes increasingly less so that successive pulses are generated at a faster rate. Just before such vehicle moves out of the beam, the pulses are generated at the most rapid rate possible, but as the vehicle moves out of the beam the rate of pulse generation is abruptly restored to the normal slow rate. For a vehicle proceeding in the opposite direction, the effect is just the opposite in that the normal slow rate immediately speeds up to a very high value as soon as the vehicle enters the beam, but the rate then is gradually reduced as the vehicle proceeds through the beam in the direction of transmission of the pulses. The apparatus includes means which is responsive to the rate at which pulses are generated and is able to distinguish between the different effects produced by vehicles traveling in respectively different directions. Moreover the rate of change of pulse transmission is a direct function of vehicle velocity, and means is also provided for giving an indication thereof.

The general principles which have been set forth as pertaining to this invention are applicable to several embodiments thereof of which four have been illustrated in the accompanying drawings.

It is an object of this invention to provide a system for the detection of objects and particularly highway vehicles wherein the vehicles are detected by the effects produced as they pass through a beam of repetitive sound pulses but wherein different distinctive effects are produced by vehicles passing in different directions so that such vehicles may be separately detected according to their direction of travel.

It is another object of this invention to provide a vehicle detection system of the kind wherein a vehicle is detected by the effect produced when the vehicle intercepts a beam of sound pulses transmitted across or along its path but wherein a distinctive indication is given only for vehicles traveling in a particular direction.

It is another object of this invention to provide an ultrasonic system of the type in which sound pulses are transmitted repetitively across or along the path of each passing vehicle whereby the speed of such vehicles may be recorded.

It is still another object of this invention to provide a vehicle detection system wherein by transmitting only a single beam of sound pulses across or along the path of the vehicles, not only are there distinctively different indications given for vehicles traveling in respectively opposite directions, but also the speed of each passing vehicle be ascertained.

Other objects, purposes and characteristic features of the present invention will be obvious from the accompanying drawings and will also in part be pointed out as the description of the invention progresses.

To simplify the illustrations and facilitate in the explanation of this invention, various parts and circuits which constitute the embodiments thereof have been shown diagrammatically and certain conventional circuit arrangements are disclosed in block since the drawings have been made more with the purpose of making it easy to understand the principles and manner of operation than to illustrate the specific construction and arrangement of parts that might be used in practice. The symbols (B+) and (B—) with an intermediate ground tap designate connections made to potentials for the various electron discharge tubes employed, and the symbols (+) and (—) indicate connections to the opposite terminals of a source of lower voltage suitable for the operation of various relays, counting devices, and the like.

In describing the invention in detail, reference will be made to the accompanying drawings in which like reference characters designate corresponding parts throughout the several views and in which.

Figure 1A:
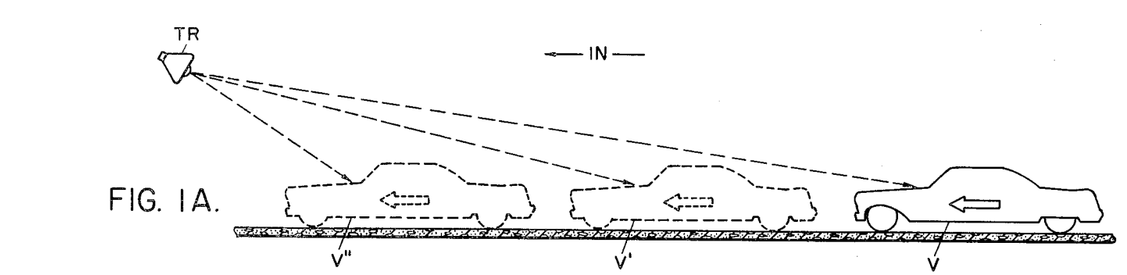
FIGS. 1A, 1B, and 1C illustrate the manner in which the sound transducer may be positioned and directed in accordance with the principles of this invention.
Figure 1B:
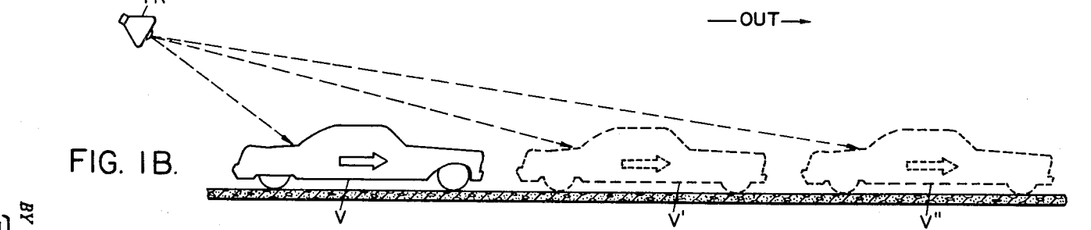
Figure 1C:
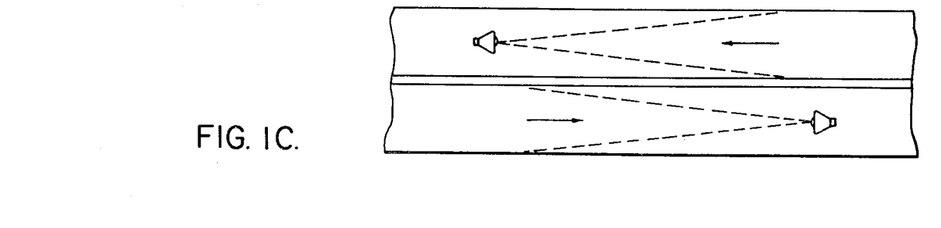

FIGS. 1A and 1B illustrate the manner in which a transducer may be positioned and directed so that a beam of repetitive sound pulses may be transmitted at an oblique angle to the roadway in the direction taken by the passing vehicles. The beam should be relatively widespread in this dimension along the roadway so that each passing vehicle may be within the beam for some appreciable time even though it is traveling at relatively high speeds. In certain applications, as will presently be brought out, it may nevertheless be desirable to confine the beam in the horizontal direction, i.e., as viewed from above so that the beam will be confined generally to a single lane of the highway and will not "spill over" into adjacent lanes. This is shown in FIG. 1C.

In the various embodiments illustrated herein, a single transducer has been shown and is employed both for the transmission of sound pulses and their reception. As is fully disclosed in the previously mentioned application Ser. No. 808,736, an ultrasonic system for the detection of vehicles may be organized to use either one transducer for both functions or may use separate transmitting and receiving transducers. Thus, although a single transducer has been shown in each instance in the present invention, it will be appreciated that separate transducers for transmitting and receiving the sound pulses may be as well employed.

In the absence of any vehicle, successive pulses are transmitted at a relatively slow rate. Thus, their normal period is at least as long as the round trip propagation time of a sound pulse from the transducer TR of FIG. 1A to a vehicle at the maximum range and back to the transducer. By "maximum range" is meant the greatest distance at which a vehicle can be from the transducer and still reflect a useable pulse back to the transducer.

In FIG. 1A, the vehicle is shown as proceeding in a direction generally against the direction of pulses transmitted from the transducer TR. As the vehicle first comes within the beam so that sound pulses impinge upon it, a portion of this impinging energy from each pulse is reflected back toward the transducer and acts upon the receiving means associated therewith to cause the next sound pulse to be transmitted. When the vehicle has moved to the position V' in FIG. 1A, the round-trip propagation time of each transmitted pulse is now appreciably less so that successive sound pulses are transmitted at a faster rate. When the vehicle is at V", the rate of pulse transmission is much higher yet. As the vehicle continues still further, it eventually leaves the beam of sound pulses and when this happens the transducer TR no longer receives any reflected pulses from the vehicle so that it can then operate only at its normal slow-running rate. At that instant, the frequency of pulse generation goes abruptly from its highest rate to the slowest rate and this occurs at a time when the pulse rate has previously been increasing relatively gradually as the vehicle moves through the beam.

In FIG. 1B, the normal slow-running rate of pulse generation is abruptly increased to the highest possible value as the vehicle enters within the beam as denoted by the position V of FIG. 1B. As the vehicle passes through the beam and appears variously at positions V' and V", the round-trip propagation time of the pulse becomes increasingly longer so that the rate of pulse transmission is correspondingly reduced. Under these circumstances, therefore, the variation of pulse rate is distinctly different from that described in connection with FIG. 1A in that, in FIG. 1B, the normal slow rate is almost instantly increased to the highest possible value when the car enters the beam and then gradually decreases as the car passes through the beam.

As will be subsequently described, these differences in the variation of rate of pulse transmission for the different directions of travel are sufficiently distinctive that the means provided by this invention can readily distinguish between vehicles moving through the detection zone in respectively opposite directions.

Because of the angle of incidence that the sound pulses make with the pavement when no vehicle is present, substantially none of the ultrasonic energy which is reflected from the pavement is re-directed back to the transducer TR so that sound pulses can only be generated at the normal self-running rate of the system when there is no vehicle present. Particularly since it may be desirable to spread the beam in the direction of travel of the vehicles, it is recognized that a larger amount of sound energy must be transmitted on each pulse as compared to that required when sound pulses are directed vertically downward toward the tops of passing vehicles as is disclosed in the previously-mentioned prior applications. However, the duty cycle of the system may be quite low in that pulses need be generated only at a relatively slow rate when no vehicles are present and the total energy requirements are thus low even though each short pulse may comprise a substantial amount of energy. Furthermore, although there is no large plane surface which is at all times directly normal to the sound beam and thus effective to reflect a substantial portion thereof back to the transducer TR, nevertheless there are a multiplicity of sound reflecting surfaces on each vehicle and these are at various angles so that, with sufficient energy in each transmitted pulse, a large enough portion thereof is reflected from one or more of the various surfaces of the vehicle and returned to the transducer TR with sufficient energy that the transducer TR and associated sensitive receiving means will produce a useable output signal even for vehicles at substantial distances from the transducer.

Figure 2:
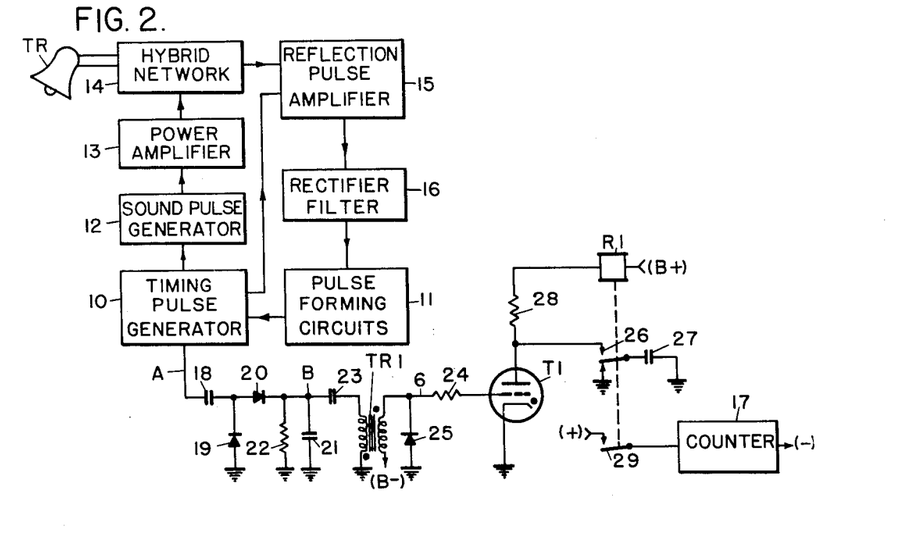
FIG. 2 illustrates one specific embodiment of the invention providing for the detection of vehicles traveling in only one particular direction and not the opposite direction.

In FIG. 2, that portion of the invention which relates to the transmission and reception of pulses and the triggering of each newly transmitted pulse upon receipt of the previous one has been shown in block diagram form. It is believed that the mode of operation can readily be ascertained therefrom by one skilled in the art; for detailed circuits reference may be made to my previously mentioned application Ser. No. 849,326.

The timing pulse generator 10 of FIG. 2 may comprise a multivibrator which is normally free-running in the absence of any input signals from the pulse-forming circuits 11. The self-running frequency of operation of the multivibrator is so selected that its period is at least as long as the round-trip propagation time of a sound pulse from the transducer TR, to a vehicle at the most remote point from which reflections of suitable amplitude may be received effective to provide a useable output signal, and back to the transducer. Each pulse provided by the timing pulse generator is applied to the sound pulse generator 12 and causes it to provide a brief electrical output signal at a distinctive frequency which may be 20 kc. for example. Each such audio frequency pulse is amplified in the power amplifier 13 and applied through the hybrid network 14 to the transducer TR. Use of the hybrid network 14 permits a single transducer to be employed for both the transmission and receipt of pulses as it isolates the power amplifier 13 from the reflection pulse amplifier 15 which responds to each echo pulse received by the transducer TR.

Each received pulse after being amplified by the amplifier 15 is supplied to the rectifier-filter 16. The rectifier-filter 16 supplies a unidirectional, filtered pulse to the pulse-forming circuits 11 for each reflection pulse received from the transducer. The pulse-forming circuits respond to such input pulse by providing a triggering output pulse to the timing pulse generator. The multivibrator included in the timing pulse generator, although normally self-running, may also be triggered by a pulse received from the pulse-forming circuit 11. Whenever any vehicle is present within the sound beam, the timing pulse generator 10 always receives a pulse from the pulse-forming circuit 11 prior to the time that it would operate of its own accord as a result of its self-running characteristics. Consequently, the timing pulse generator always operates at a faster rate when there is a vehicle within the beam to provide such reflection pulses.

The timing pulse generator 10 provides a trigger pulse of uniform amplitude at point A for each cycle of its operation. The voltage that thus appears at point A may be as shown in the corresponding line A of FIG. 3A. Prior to the entry of a vehicle into the sound pulse beam, the pulses at line A occur at a uniform, slow rate, but as the vehicle moves closer to the transducer as shown in FIG. 1A, the pulses occur at a constantly faster rate since each echo pulse is now received much more quickly following transmission of its originating pulse. Just before the vehicle passes out of the beam, the timing pulse generator is operating at its maximum rate and, as shown at line A of FIG. 3A, the pulses that are provided at point A of FIG. 2 are then closely spaced. Immediately upon the exit of the vehicle from the beam, the timing pulse generator 10 is restored to its normal self-running rate since it no longer receives any reflection pulses and, as shown at line A of FIG. 3A, the pulses appearing at point A then become considerably more spaced in time. For a vehicle traveling in the opposite direction, FIG. 3B at line A indicates that the effect is just the opposite in that the normal slow rate of occurrence of pulses at point A of FIG. 2 is abruptly increased so that the pulses are very closely spaced when the vehicle first enters the beam. As the vehicle progresses through the beam, however, the pulses become increasingly spaced until they are finally restored to their normal slow recurrence rate when the timing pulse generator again becomes self-operating due to the lack of driving pulses from the pulse-forming circuit 11.

Figure 3A:
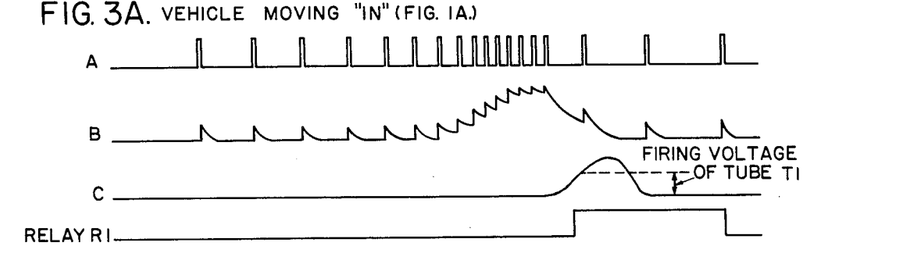
FIGS. 3A and 3B illustrate waveforms which are particularly applicable to the operation of the embodiment of FIG. 2 but are also of aid in understanding the other embodiments of this invention.

The detailed circuit organization of FIG. 2 discloses a means whereby the passage of a vehicle may be registered only if it is proceeding in one of the two opposite directions since, as will be seen, this particular embodiment is so organized that the relay R1 will be actuated to provide an input to the counter 17 only for a vehicle moving in the "in" direction according to FIGS. 1A and 3A. A vehicle moving in the "out" direction will not be registered.

The circuit comprising capacitor 18, rectifies 19 and 20, and capacitor 21 in parallel with discharge resistor 22 comprise a voltage-doubling rectifier circuit which causes capacitor 21 to be charged to a voltage which is proportional to the rate of occurrence of positive-going pulses at point A. Each positive-going voltage variation occurring at point A upon the leading edge of each positive trigger pulse causes capacitor 21 to charge through the capacitor 18 and rectifier 20. Upon each negative-going voltage variation at point A occurring at the trailing edge of each positive trigger pulse there can be substantially no effect upon the charge previously placed upon capacitor 21 because of the blocking action of rectifier 20. At such time, however, capacitor 18 charges negatively through the rectifier 19. Because of this, the following positive-going variation on each pulse leading edge is effective to place an additional charge upon capacitor 21. This capacitor 21 can discharge only relatively slightly between successive charging pulses so that, when the pulses at point A appear with a relatively high frequency, capacitor 21 receives more additional charge in response to each such pulse than it loses between successive pulses by discharging through the parallel resistor 22. Therefore, the voltage across capacitor 21 is directly affected by the rate at which the pulses appear at point A. When the timing pulse generator is operating at its normal slow rate, capacitor 21 can lose its acquired charge in the interval between successive pulses so that the voltage at point B can remain at a normal low value at such times as shown at line B of FIG. 3A. However, when echo pulses are received from a vehicle so that the timing pulse generator 10 operates at a more rapid rate, the voltage across capacitor 21 starts to increase. When the pulse rate is at its maximum value, the voltage across capacitor 21 may have increased substantially above its normal low value, but its rate of increase is gradual as long as the rate of increase of the pulse repetition rate is similarly gradual. However, when the vehicle passes out of the beam of sound pulses, the timing pulse generator abruptly is restored to its normal slow rate from the maximum rate of operation and when this occurs the capacitor 21 quickly discharges through the associated resistor 22 and its voltage then is abruptly reduced toward its normal low value as shown at line B of FIG. 3A.

Figure 3B:
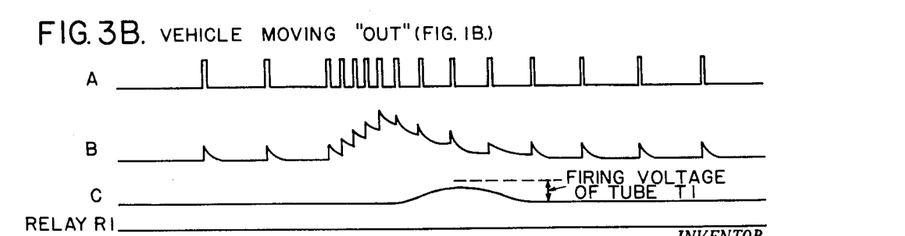

For a vehicle moving in the opposite direction, FIG. 3B shows at line B that the voltage across capacitor 21 rises quickly above its normal low value as the vehicle moves into the beam and the frequency of the timing pulse generator abruptly rises in value above its normal level. Having once reached the maximum value, the capacitor 21 voltage decreases slowly as shown at line B of FIG. 3B as the vehicle proceeds through the beam and becomes increasingly remote from the source of pulses.

The voltage across capacitor 21 is applied through coupling capacitor 23 to the primary winding of transformer TR1 whose lower terminal is connected to ground. The secondary winding of this transformer is connected in series between the (B—) terminal and through grid-current-limiting resistor 24 to the control grid of thyratron T1. The voltage from (B—) which normally appears on the control grid of thyratron T1 holds this tube in a normally nonconductive state and this bias voltage can only be overcome by a voltage pulse induced in the secondary winding of transformer TR1 which is of sufficient amplitude to overcome such bias and which also is of the proper polarity i.e., of such a polarity that its upper terminal is positive with respect to the lower terminal. Because of the polarity markings shown as being associated with the primary and secondary windings of transformer TR3, a secondary induced voltage of the desired polarity can only appear as a result of a decrease of voltage at the upper terminal of the primary winding of this transformer. As shown at line B of FIG. 3A, such a decrease in voltage occurs when the voltage across capacitor 21 is abruptly reduced in amplitude at the time when the timing pulse generator has its frequency abruptly restored to the normal slow operating value. It is at this time then that tube T1 is fired. The rise in voltage which precedes this abrupt decline in capacitor 21 voltage is not only a voltage change in the wrong direction to produce the desired polarity of transformer secondary voltage, but is also too gradual so that there is not a sufficient rate of change of current through the primary winding to produce a secondary pulse of sufficient amplitude to overcome the negative grid bias on thyratron T1.

Observing at line B of FIG. 3B the manner in which capacitor 21 voltage varies for a vehicle moving in the opposite direction, it is noted that here, too, there is a decline in voltage of the capacitor following the initial abrupt rise but this, too, is a gradual decline so that again the induced pulse in the secondary winding of transformer TR1 is not of sufficient amplitude to drive the grid of thyratron T1 into the conductive region. The more abrupt voltage variation which occurs previous to this when the vehicle first moves into the sound beam and causes the timing pulse generator to operate at its most rapid rate does not produce a current change in the primary in the proper direction to produce a positive pulse in the secondary winding which can overcome the negative bias voltage. It is only the very abrupt, "snap" action of the timing pulse generator 10 in going from its high frequency of operation to the normal low frequency of operation that will produce the proper polarity and amplitude of pulse in the secondary winding of transformer TR1 to cause thyratron T1 to fire. Such pulse is shown as appearing at line C of FIG. 3A at the time the vehicle moves out of the detection zone and, as shown, its amplitude is more than ample to cause thyratron T1 to fire so that relay R1 is picked up. FIG. 3B shows that the positive pulse induced in the TR1 secondary winding for the vehicle moving in the opposite direction is of considerably lower amplitude than is required to fire thyratron T1 so that relay R1 remains dropped away. Any tendency for the grid voltage of thyratron T1 to overshoot and thereby produce a negative-going voltage variation at the grid of this tube and thus drive the grid below the level of the grounded cathode is prevented by diode 25 connected from the upper terminal of the secondary winding of transformer TR1 to ground.

It is a characteristic of a thyratron tube that when once fired it remains conductive. When thyratron T1 is fired, the flow of its plate current through the winding of relay R1 quickly causes this relay to be actuated. When it closes its front contact 26, capacitor 27 which is normally discharged as a result of the connection of both terminals to ground through back contact 26 now is connected from ground to the plate of thyratron T1. The current normally flowing through the winding of relay R1 and through the plate resistor 28 is temporarily diverted to charging the capacitor 27 so that relay R1 remains energized for a time while the capacitor 27 is charging. At the same time, the connection of the discharged capacitor to the plate of thyratron T1 sufficiently lowers the plate voltage of this tube for a long enough time that the tube is extinguished. As capacitor 27 charges, the current through relay R1 decreases in amplitude until finally it is insufficient to maintain relay R1 picked up. The overall action then is that the firing of T1 picks up relay R1 which quickly causes T1 to be extinguished, but relay R1 remains picked up for a predetermined interval dependent on the charging time constant of capacitor 27 and is then restored to its normal dropped-away condition. Throughout the time relay R1 is picked up, its front contact 29 is closed and energy is applied from (+) to the counter 17. This momentary energization of the counter 17 causes the addition of a count representing the passage of a single vehicle.

Figure 4:
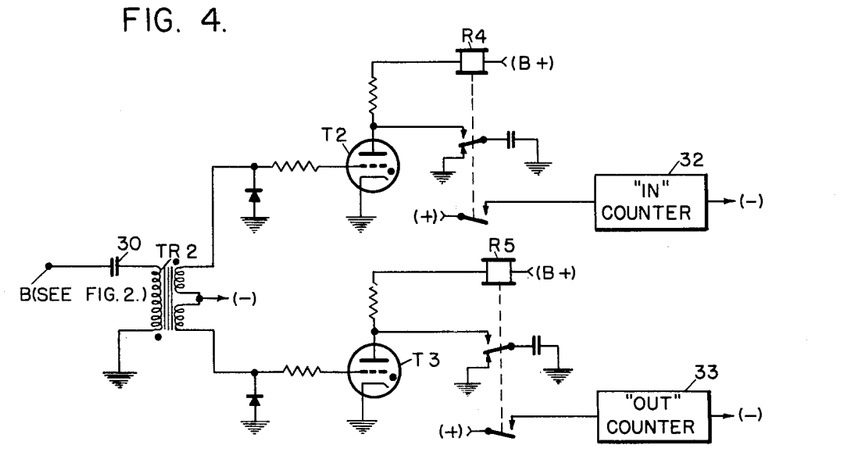
FIG. 4 illustrates another embodiment of this invention whereby vehicles traveling in opposite directions may be separately recorded.

The embodiment of FIG. 4 is somewhat similar to FIG. 2 just described but differs in that there are two counters, one for each direction of traffic, and a respective thyratron T2 and T3, one for each counter. The circuit organization which applies the positive-going trigger pulses to terminal B of FIG. 4 is the same as that disclosed in FIG. 2. These pulses are applied through a capacitor 30 to the primary winding of a transformer TR2 having two secondary windings. The grid-cathode circuit of thyratron T2 includes the upper one of the secondary windings, whereas thyratron T3 has in its grid circuit the lower of these two secondary windings. As shown, these windings are so poled that a decrease of voltage at point B produces a voltage increase at the upper terminal of the upper secondary winding which counteracts the negative grid bias voltage. The circuit for the control of thyratron T2 is thus exactly like that provided for thyratron T1 of FIG. 2 so that thyratron T2 will be fired whenever there is an abrupt decrease in voltage at point B. To produce a similarly effective positive-going voltage variation at the grid of thyratron T3 requires that there be a voltage increase at point B. FIG. 3A, line B illustrates that there is an abrupt decrease in voltage at point B for a vehicle moving in the "in" direction but not for a vehicle moving in the "out" direction. Tube T2 will fire and relay R4 will pick up momentarily therefore only for a vehicle moving "in,"

but not for a vehicle moving "out." FIG. 3B, on the other hand, shows that there is an abrupt increase of voltage at point B for a vehicle moving "out," but not for a vehicle moving "in." Tube T3 will fire and relay R5 will pick up momentarily therefore only for a vehicle moving "out." The relays R4 and R5 are thus each picked up only for a respective one of the two opposite directions of travel. The picking up of relay R4 causes a count to be added to the "in" counter 32, and the picking up of relay R5 similarly causes the addition of a count to the "out" counter 33.

Figure 5:
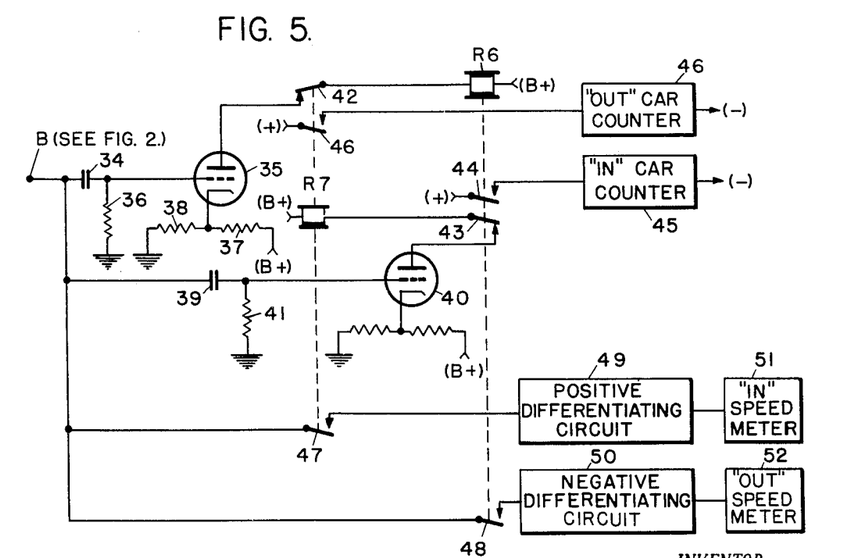
FIG. 5 illustrates still another embodiment of this invention for both separately recording vehicles traveling in respectively opposite directions and also for indicating the speed of each passing vehicle.

In the embodiment of FIG. 5 a different principle is utilized to distinguish between cars moving in the different directions. In this embodiment, the voltage at point B is applied through a coupling capacitor 34 to the grid of the triode tube 35. The grid of this tube is also connected to ground through grid leak resistor 36 and its cathode is positively biased by being connected to the junction of the voltage dividing resistors 37 and 38 connected between (B+) and ground. This positive bias voltage ensures that tube 35 is normally in a cut-off condition so that relay R6 included in its plate circuit is normally dropped away. As shown by the heavy base and top lines for the symbol designating this relay R6, it is constructed to have both slow pick up and slow release characteristics.

The voltage at point B is also applied through a coupling capacitor 39 to the grid of triode tube 40. The grid of this tube is similarly connected through grid leak resistor 41 to ground and its cathode is positively biased in a manner similar to that provided for tube 35. Tube 40 is therefore also normally in a cut-off condition. The cathode of tube 40 is, however, at a more positive potential than is the cathode of tube 35. Therefore, for equal and increasing voltages applied to the grids of both tubes, tube 35 will become conductive before tube 40 becomes conductive.

For a vehicle moving in the "in" direction so that the voltage at point B varies in the manner shown at FIG. 3A, line B, the steady increase of voltage causes the grid of tube 35 to be driven steadily more positive until finally the grid is sufficiently positive with respect to the already positive cathode that sufficient plate current will pass through the normally closed back contact 42 of relay R7 and through the winding of relay R6 to pick up this relay. When this happens, the normally closed back contact 43 of relay R6 is opened thereby opening the circuit for relay R7 so that this relay cannot pick up even though the grid voltage of tube 40 will subsequently rise to a sufficient value that this tube would otherwise also conduct sufficient current to pick up the relay included in its plate circuit. The picking up of relay R6 also closes its front contact 44 so that energy is applied to the "in" car counter 45, thereby registering the passage of a car moving in the "in" direction. The abrupt return of the voltage at point B to its normal low value has no substantial effect; although it may immediately render tube 35 nonconductive, relay R6 will remain picked up for a brief interval because of its slow release characteristics so that energization will be maintained on counter 45 long enough for the car count to be registered.

For a car moving in the "out" direction, the voltage rises abruptly at point B as illustrated in FIG. 3B at line B. The grid voltage of tube 35 is quickly raised to the level where its cathode bias is overcome and sufficient current flows through the winding of relay R6 to pick it up. However, because of the slow pick up characteristics of this relay, it cannot pick up immediately. Before it has time to pick up, the voltage has risen at the grid of tube 40 sufficiently that a high enough level of current is applid through back contact 43 to the winding of relay R7 to pick this relay up. Since relay R7 is a quick pick-up relay, it will pick up before relay R6 picks up. When this happens, back contact 42 of relay R7 opens, thereby opening the plate circuit of tube 35 so that all energy is removed from the winding of relay R6. Thus, for a voltage waveform at point B as produced by a vehicle moving in the "out" direction, relay R7 rather than relay R6 will pick up. The closure of front contact 46 of relay R7 causes energy to be momentarily applied to the "out" car counter 46 so that the passage of a car moving in the "out" direction is recorded.

Regardless of the direction of the travel of the car, the respective tube 35 or 40 is restored to its normal non-conductive condition after the car has passed out of the sound beam since, for either direction of travel, the voltage at point B is restored upon the passage of a car to its normal low value.

The rate of rise of the voltage at point B for a vehicle moving in the "in" direction is proportional to the velocity of such vehicle. For a vehicle moving in the "out" direction, the initial rise of voltage at point B has no real relationship to vehicle velocity, but the gradual decline of voltage which follows is a measure of car speed. These rising and falling voltages at point B may be utilized to give an indication of vehicle speed.

To accomplish a registration of vehicle speed, the voltage at point B is applied to the respective positive differentiating circuit 49 and negative differentiating circuit 50. The outputs of these differentiating circuits are then applied to the respective "in" and "out" speed meters 51 and 52. The positive differentiating circuit provides an output signal to the "in" speed meter 51 only when the voltage applied to it is increasing so that the speed meter 51 does not respond to the abrupt negative-going variation that also appears at point B. The speed meter 51 therefore receives an input signal whose amplitude is proportional to the rate of rise of voltage at point B and thus also to vehicle velocity. The speed meters 51 and 52 may be any of several well-known forms and may comprise a voltmeter, for example, whose scale is calibrated in terms of vehicle velocity.

For a vehicle moving in the "out" direction, there is an abrupt rise in voltage at point B followed by a more gradual decline as indicated at FIG. 3B, line B. The initial abrupt rise in voltage does not affect the "out" speed meter 52 because the negative differentiating circuit provides an output signal only when there is a voltage decrease at point B. Since the signal it does provide is proportional to the rate of change of the voltage at point B, it is proportional to vehicle velocity, and the speed meter 52 therefore gives an indication of such speed.

Figure 6:
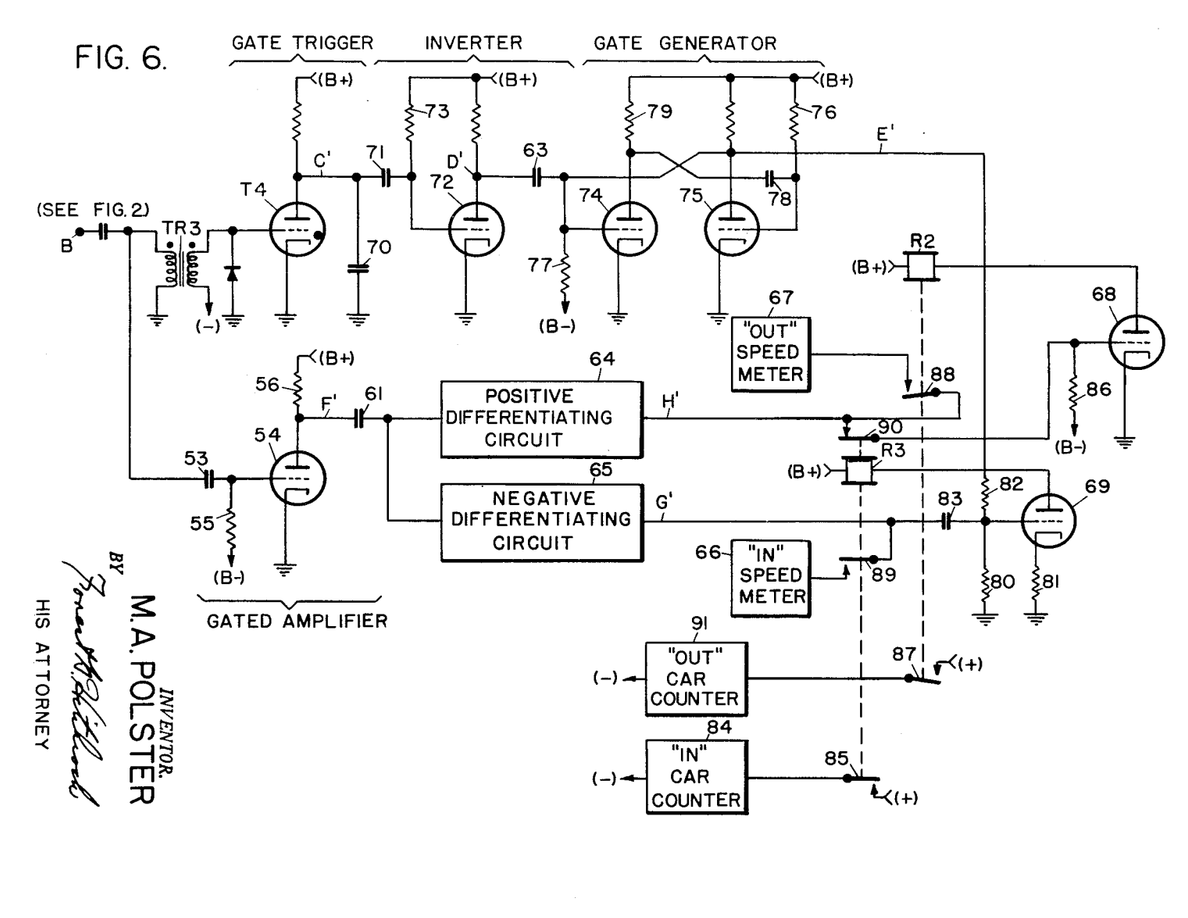
FIG. 6 illustrates still another embodiment of this invention for separately detecting vehicles traveling in opposite directions and for detecting the speed thereof.

In the embodiment of the invention illustrated in FIG. 6, the voltage at point B is applied through coupling capacitor 53 to the control grid of triode amplifier tube 54. The cathode of this tube is grounded, and its control grid is connected through resistor 55 to the (B−) source of voltage so that the tube is normally biased to a nearly nonconductive condition. The plate of the tube is connected through plate load resistor 56 to the (B+) source of voltage.

Figure 7:
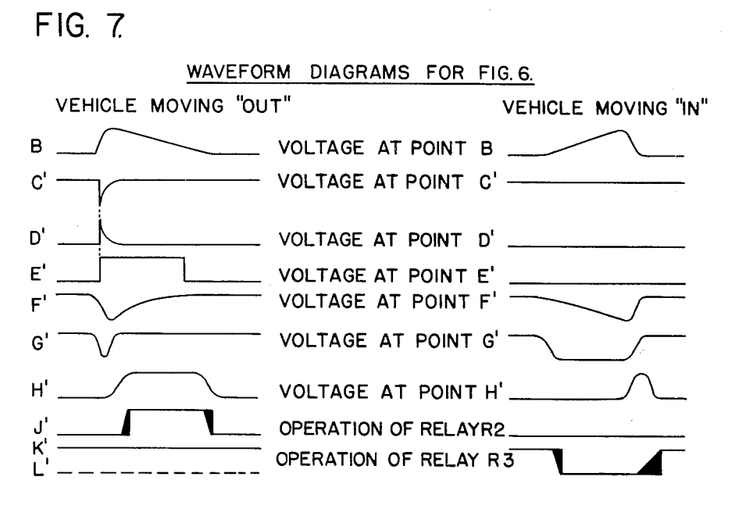
FIG. 7 is a waveform diagram applicable to the embodiment of the invention illustrated in FIG. 6.

The voltage at point B is always positive with respect to its normal value when there is a vehicle within the detection zone (see FIG. 7, line B′). This drives the control grid of tube 54 positive and renders the tube more conductive so that the voltage appearing at the plate of this tube corresponds generally to the waveform of voltage at point B but is reversed in phase. (Compare lines B and F′, FIG. 7.) This voltage is applied through coupling capacitor 61 to the positive differentiating circuit 64 and negative differentiating circuit 65 respectively. The outputs of these two differentiating circuits 64 and 65 are applied to the respective triode tubes 68 and 69 which control the vehicle detection relays R2 and R3 and also to the "in" and "out" speed meters 66 and 67.

It is desired that the more gradual variation of voltage at point B and not its abrupt variation to or from the normal be employed to control the vehicle detection relays and also the speed meters. More specifically, for a vehicle moving in the "in" direction (see FIG. 3A, line B), it is desired that the vehicle detection relays and speed meters respond to the more gradual initial rise of voltage but not to the abrupt return of that voltage to normal which occurs when the vehicle moves out of the detection zone. Similarly, for a vehicle moving in the "out" direction (see FIG. 3B, line B), it is desired that the initial abrupt rise in voltage occurring when the vehicle first moves into the detection zone be of no effect but that the more gradual decline of voltage which follows as the vehicle moves through the detection zone selectively control the vehicle detection relays and the speed meters. One of the features of this embodiment resides in the manner in which the apparatus is rendered nonresponsive to these abrupt voltage variations.

For each vehicle moving in the "out" direction, the initial abrupt rise of voltage at point B produces a voltage pulse across the secondary winding of transformer TR3 which is of positive polarity and of sufficient amplitude to fire thyratron T4. When thyratron T4 is fired, the normally charged capacitor 70 connected from its plate to ground is quickly discharged through the conductive plate-cathode circuit, and the voltage at the plate of the tube is then reduced to a sufficiently low value and for a long enough time that tube T4 is quickly restored to its normal nonconductive state. However, the momentary conductive condition of the tube results in a negative-going voltage variation appearing at its plate, (FIG. 7, line C') and this is applied through the differentiating capacitor 71 to the control grid of triode tube 72. This triode tube is normally conductive because its control grid is connected directly through resistor 73 to the (B+) source of voltage. However, the differentiating circuit comprising capacitor 71 and resistor 73 causes the grid to go negative, below cut-off, for a short length of time in response to each negative-going voltage variation at the plate of thyratron T4. Because of this, the normally low plate voltage which exists at the plate of tube 72 because of its conductive state abruptly rises in value to a high level and is then quickly restored to its low value as tube 72 again becomes conductive. The effect then is that tube 72 acts as an inverter in that it provides a positive-going trigger pulse (FIG. 7, line D') at its plate for each negative-going voltage variation at the plate of thyratron T4.

The positive-going trigger pulse at the plate of tube 72 is applied through a coupling capacitor 63 to the control grid of tube 74. Tube 74 is inter-connected with tube 75 to form a one-shot multivibrator circuit. The operation of such a multivibrator circuit is well-known in the art and need not be described in detail here. Briefly, however, it may be stated that tube 75 is normally in a fully conductive condition because its grid is connected through resistor 76 to (B+), but tube 74 is fully cut-off because its grid is connected through resistor 77 to the (B—) source of voltage. In response to the positive-going trigger pulse applied to the grid of tube 74, this tube is momentarily rendered conductive and when this happens there is an almost instantaneous reversal in the relative conductive states of these tubes 74 and 75 so that tube 74 becomes fully conductive and tube 75 is cut off. This condition persists for a length of time determined by the discharge time for capacitor 78 connecting the grid of tube 75 to the plate of tube 74. Eventually tube 75 is again rendered conductive and tube 74 nonconductive. During the interval of time that tube 75 is in the nonconductive state, however, a high voltage exists at its plate (FIG. 7, line E') because of the very small voltage drop across plate load resistor 76.

The operation of this gating circuit is such, therefore, that for each vehicle moving in the "out" direction, the initial abrupt rise in voltage at point B immediately causes tube 75 to become nonconductive so that a high voltage appears for a time at the plate of tube 75 and this voltage is applied to the grid circuit of tube 69. As is also shown in FIG. 7, the gate generator is not operated so as to produce the high voltage at the plate of tube 75 for a vehicle moving in the "in" direction. The reason for this is that, under such circumstances, there is no positive-going voltage variation at point B which can cause thyratron T4 to be fired.

The multivibrator included in the gate generator is so organized that it will remain in the state wherein tube 75 is nonconductive only for approximately the length of time required to encompass the abrupt rise in voltage at point B which occurs when a vehicle moving in the "out" direction first enters the detection zone. This amount of time is substantially independent of vehicle speed so that a fixed time of operation of the multivibrator may be used.

The output voltage from the gate generator and, more specifically, the plate voltage of tube 75, controls tube 69 so that it can respond only to the desired portion of the signal appearing at point B and not to the abrupt voltage rise first occurring when a vehicle moving in the "out" direction enters the detection zone. Thus, the abrupt voltage rise at point B produces a corresponding decrease in voltage in the plate of tube 54 (compare lines B and F', FIG. 7), and such voltage decrease causes the negative differentiating circuit 65 to supply to the grid circuit of tube 69 a negative voltage whose amplitude is proportional to the rate of change of the voltage at the plate of tube 54 as it varies negatively. The grid and cathode of tube 69 are returned to ground through resistors 80 and 81, respectively, so that tube 69 is ordinarily fully conductive and relay R3 included in its plate circuit is picked up.

Therefore, were it not for the effect of the voltage obtained from tube 75 and applied to the grid of this tube through resistor 82, the negative voltage applied to the grid through capacitor 83 at the time of the abrupt initial voltage rise at point B, tube 69 would be rendered nonconductive by such negative voltage and relay R3 dropped away so that a count would be registered on the "in" car counter 84 by closure of back contact 85 of relay R3. This is prevented by the operation of the gate generator; the high plate voltage provided by tube 75 during the critical interval when the voltage at point B rises abruptly sufficiently raises the grid potential of tube 69 that the negative voltage provided by the negative differentiating circuit 65 cannot make tube 69 nonconductive. By the time the gate generator has been restored to the normal condition so that the voltage at the plate of tube 75 is again at its normal low value, the voltage at the plate of tube 54 is then varying positively (see line F', FIG. 7) and this positive variation of voltage cannot produce an output from the negative differentiating circuit 65 so that there can be no effect upon relay R3.

For such vehicle moving in the "out" direction, there is a more gradual decline of voltage at point B following the initial abrupt rise and this produces a positive-going voltage variation at the plate of tube 54 as shown at line F' of FIG. 7. This positive-going voltage variation produces a positive output voltage from the positive differentiating circuit 64 as shown at line H' of FIG. 7, and the amplitude of this positive voltage is proportional to the rate of change of voltage at point B and thus corresponds to the speed of the vehicle. This voltage is applied to the grid of triode amplifier 68 and overcomes the cut-off bias normally effective on this tube and applied to its grid from (B—) through resistor 86. Tube 68 is therefore rendered conductive so that relay R2 included in its plate circuit is picked up. One effect of this is that front contact 87 of relay R2 closes so that energy is applied from (+) to the "out" car counter 91. Another effect of the picking up of relay R2 is that its front contact 88 also closes so that the output voltage of the positive differentiating circuit 64 can now be applied to the "out" speedmeter 67. Since the amplitude of signal applied to the meter 67 is dependent upon vehicle speed, the meter is caused to give a distinctive indication of vehicle speed in the same manner as described for the other embodiments of this invention.

For a vehicle moving in the "in" direction, there is no abrupt positive-going rise of voltage at point B. Thyratron T4 is therefore not fired for a vehicle moving in the "in" direction, and no blanking voltage is then applied to the grid of tube 69 to maintain this tube conductive. For a vehicle moving in this direction, the voltage at point B increases relatively gradually so that there is a corresponding negative-going voltage variation at the plate of tube 54. This variation produces a negative output voltage from the negative differentiating circuit 65 whose amplitude is proportional to the rate of change of the voltage in the plate of tube 54. In the absence of the blanking voltage derived from the gate generator, this negative voltage reduces the grid potential of tube 69 sufficiently so that relay R3 in its plate circuit is dropped away. When this happens, back contact 85 of the relay is closed so that an additional vehicle count is registered on the "in" car counter 84. The simultaneous closure of back contact 89 of relay R3 causes the output of negative differentiating circuit 65 to be applied to the "in" speedmeter 66, thereby causing the meter 66 to record the speed of the passing vehicle.

For each vehicle moving in the "in" direction, the initial, relatively gradual rise of voltage at point B is followed by an abrupt restoration of the voltage to the normal level. This abrupt variation produces a correspondingly abrupt positive-going voltage rise at the plate of tube 54. It is necessary that means be provided to prevent this positive-going variation and the corresponding positive voltage change it produces at the output of the positive differentiating circuit 64 from acting upon tube 68 to render it conductive and pick up relay R2. This is done by permitting the output of the positive differentiating circuit 64 to be applied to the control grid of tube 68 only when relay R3 is picked up so that its front contact 90 is closed. The description previously given has pointed out that relay R3 is dropped away by the initial, gradual rise of voltage at point B when a vehicle is moving through the detection zone in the "in" direction. Therefore, upon the occurrence of the abrupt restoration of point B voltage to the normal level, relay R3 is still in its dropped-away condition and the positive output voltage of the positive differentiating circuit 64 cannot be applied to the grid of tube 68. As shown at line L' of FIG. 7, the relay R3 may be selected to have slow pick up characteristics to ensure that it will not be picked up until after the positive voltage at point H' has subsided. Relay R3 is therefore the only relay that will be actuated for each vehicle moving through the detection zone in the "in" direction.

In the various embodiments of the invention disclosed, the transducer has been shown as being positioned above the highway lane and so directed that the beam of pulses is transmitted obliquely downward toward the lane so that at least a substantial component of the direction of pulse transmission lies parallel to the direction of motion of the vehicles. The invention may equally be practiced with the transducer in other positions as, for example, alongside the highway lane rather than above it.

In the various modifications disclosed, the pulse transmitting means normally generates successive pulses at a slow rate. Under certain circumstances it may be desirable that pulses normally not be transmitted but only when a vehicle is within the detection zone. Since the transmission of pulses when a vehicle is present is dependent upon the reception of reflections, some means must then be employed to cause the first pulse to be transmitted and any of various well-known expedients may be used to detect the presence of a vehicle and thereby cause the first pulse to be transmitted toward such vehicles.

In the different embodiments, certain specific polarities of voltages have been mentioned. It has, for example, been disclosed that a positive voltage is generated whose amplitude is proportional to the rate of pulse transmission. Obviously, a negative voltage could as well be generated. Similarly, various polarities of voltage may be selected without depending from the teachings of this invention.

Throughout the disclosure, it has been shown and described that the energy pulses which are reflected from vehicles are sound pulses which would ordinarily be of an ultrasonic frequency. However, it is desired to be understood that the principles of this invention are not limited to the use of sound pulses, but that other types of discrete energy pulses may as well be used.

Having described a system for the selective detection of vehicles according to their direction of travel together with means for measuring the speed of such vehicles, I desire it to be understood that various additional modifications, adaptations and alterations may be made to the various forms shown to meet the requirements of practice without in any manner departing from the spirit or scope of this invention.

What I claim is:

1. In a system for selectively detecting the passage of vehicles according to their direction of travel along a defined path, the combination comprising, transmitting means for generating discrete sound pulses and also including a transducer for directing said pulses in a beam at an angle oblique to said path, receiving means being distinctively controlled by reflections of said sound pulses from vehicles within a detection zone defined by said beam, said transmitting means including sound pulse generation means for controlling the rate of transmission of said sound pulses and normally causing said pulses to be transmitted with a period at least as long as the time required for a sound pulse to travel from said transmitting means to said receiving means via a reflection from a vehicle at maximum range in said zone, said receiving means in response to the reception of a reflection pulse acting on said sound pulse generation means to cause a following sound pulse to be transmitted by said transmitting means, whereby said repetition rate of said sound pulse generation means varies in a distinctive first or second manner according to whether said vehicle passes through said zone in a respective first or second direction, and vehicle detecting means including a binary device being operated by said sound pulse generation means from its normal condition to a distinctive condition to indicate thereby the passage of said vehicle in said first direction only when said repetition rate varies in said first distinctive manner.

2. The system as defined in claim 1 and including additional vehicle detection means comprising a second binary device also being actuated by said sound pulse generation means from its normal condition to a distinctive condition to indicate thereby the passage of said vehicle in said second direction only when said repetition rate varies in said second distinctive manner.

3. The system as defined in claim 1 wherein said first distinctive manner of variation of said repetition rate includes an abrupt variation of said repetition rate in one direction and wherein said second distinctive manner of variation includes an abrupt variation of said repetition rate in the opposite direction, said abrupt variations occurring when said repetition rate is rapidly altered between the maximum rate for a vehicle in the portion of said zone nearest said transducer and said normal rate when no vehicle is within said zone, said binary device included in said vehicle detecting means being controlled from its normal condition to said distinctive condition only by said abrupt variation of said repetition rate in said one direction.

4. The system as defined in claim 3 wherein said vehicle detecting means includes: converter means connected to said sound pulse generation means and generating an output signal having an amplitude proportional to the repetition rate of said sound pulse generating means, circuit means being operable from a normal condition only in response to an input signal having a particular polarity and an amplitude above a predetermied minimum value, transformer circuit means connected between said converter means and said circuit means and having said output signal applied to primary winding and generating said input signal in its secondary winding, said input signal of particular polarity and amplitude above said minimum value being induced in said secondary winding only when said repetition rate varies abruptly in said one direction.

5. The system according to claim 1 and also including means conected to said sound pulse generation means and being differently controlled according to the rate of change of the repetition rate of said sound pulse generating means for giving an indication of the speed of each vehicle passing through said zone.

6. A system for selectively detecting the passage of vehicles moving in either of two generally opposite directions along a designated lane and through a detection zone comprising, transmitting means including a transducer positioned adjacent said lane for directing a beam of repetitive energy pulses in a direction having at least a substantial component thereof parallel to said lane with said beam defining said zone, receiving means being distinctively controlled by reflections of said pulses received from a vehicle in said zone, first circuit means being controlled by said receiving means for controlling said transmitting means to transmit a pulse at substantially the time of reception of a reflection pulse by said receiving means, second circuit means for controlling said transmitting means to transmit a first pulse to said vehicle after it enters said zone, whereby the rate at which said pulses are transmitted increases for a vehicle moving in said zone in one direction and decreases for a vehicle moving in said zone in the opposite direction, and vehicle registering means responsive to said transmitting means and being operated to register the passage of a vehicle in said zone in a particular direction only when said rate varies in the direction corresponding to said particular direction.

7. The system of claim 6 wherein said transducer is an electro-acoustical transducer for transmitting sound pulses and is positioned over the top of said lane and directs said beam obliquely dowwnardly toward said lane.

8. A system for selectively detecting the passage of vehicles moving in either of two generally opposite directions along a designated lane and through a detection zone comprising, transmitting means including a transducer adjacent said lane for directing a beam of repetitive energy pulses in a direction having at least a substantial component thereof parallel to said lane with said beam defining said zone, receiving means being distinctively controlled by reflections of said pulses received from a vehicle in said zone, first circuit means being controlled by said receiving means for controlling said transmitting means to transmit a pulse at substantially the time of reception of a reflection pulse by said receiving means, second circuit means for controlling said transmitting means to transmit said pulses at a normal rate slower than the minimum rate said pulses are transmitted when said transmitting means is controlled by said first circuit means, whereby for each vehicle passing through said zone in one direction generally toward said transducer the rate of pulse transmission varies in a first distinctive manner comprising a relatively gradual variation from said normal value to a higher value with a subsequent abrupt restoration of said rate to normal as said vehicle passes out of said zone and whereby for a vehicle passing through said zone in the opposite direction said rate varies in a second distinctive manner comprising an abupt increase from said normal value to a higher value with a subsequent relatively gradual decrease of said rate toward said normal value, converter means responsive to said transmitting means for generating a voltage having an amplitude proportional to the rate of pulse transmission, and registering means being controlled to a distinctive condition to register a vehicle in said zone only in response to an abrupt change in said voltage in a selected direction.

9. A system for selectively detecting the passage of vehicles moving in either of two generally opposite directions along a designated lane and through a detection zone comprising, transmitting means including a transducer positioned adjacent said lane for directing a beam of repetitive energy pulses in a direction having at least a substantial component thereof parallel to said lane with said beam defining said zone, receiving means being distinctively controlled by reflections of said pulses received from a vehicle in said zone, first circuit means being controlled by said receiving means for controlling said transmitting means to transmit a pulse at substantially the time of reception of a reflection pulse by said receiving means, second circuit means for controlling said transmitting means to transmit said pulses at a normal rate slower than the minimum rate said pulses are transmitted when said transmitting means is controlled by said first circuit means, whereby for each vehicle passing through said zone in one direction generally toward said transducer the rate of pulse transmission varies in a first distinctive manner comprising a relatively gradual variation from said normal value to a higher value with a subsequent abrupt restoration of said rate to normal as said vehicle passes out of said zone and whereby for a vehicle passing through said zone in the opposite direction said rate varies in a second distinctive manner comprising an abrupt increase from said normal value to a higher value with a subsequent relatively gradual decrease of said rate toward said normal value, converter means connected to said transmitting means for generating an output voltage having an amplitude proportional to the rate of pulse transmission, a first relay and a second relay both being operated from their normal conditions by the output voltage of said converter means, said first relay being operated from its normal condition by a lower level of said output voltage from said converter means than said second relay, said first relay having slower operating characteristics than said second relay, and means controlled by each relay when operated from its normal condition for controlling the other of said relays to be nonresponsive to the output of said converter means, said first relay thereby being operated from its normal condition only when said rate of pulse transmission varies in said first distinctive manner but said second relay being operated from its normal condition only when said rate of pulse transmission varies in said second distinctive manner, and means controlled by said first and second relays respectively for providing distinctive indications of the passage of vehicles in said one and said opposite directions respectively.

10. A system for selectively detecting the passage of vehicles moving in either of two generally opposite directions along a designated lane and through a detection zone comprising, transmitting means including a transducer positioned adjacent said lane for directing a beam of repetitive energy pulses in a direction having at least a substantial component thereof parallel to said lane with said beam defining said zone, receiving means being distinctively controlled by reflections of said pulses received from a vehicle in said zone, first circuit means being controlled by said receiving means for controlling said transmitting means to transmit a pulse at substantially the time of reception of a reflection pulse by said receiving means, second circuit means for controlling said transmitting means to transmit said pulses at a normal rate slower than the minimum rate said pulses are transmitted when said transmitting means is controlled by said first circuit means, whereby for each vehicle passing through said zone in one direction generally toward said transducer the rate of pulse transmission varies in a first distinctive manner comprising a relatively gradual variation from said normal value to a higher value with a subsequent abrupt restoration of said rate to normal as said vehicle passes out of said zone and whereby for a vehicle passing through said zone in the opposite direction said rate varies in a second distinctive manner comprising an abrupt increase from said normal value to a higher value with a subsequent relatively gradual decrease of said rate toward said normal value, converter means connected to said transmitting means for generating a voltage having an amplitude proportional to the rate of pulse transmission, first means including first differentiating circuit means being controlled by the output of said converter means to a distinctive condition to indicate the passage of a vehicle in said one direction when said rate of pulse transmission increases relatively gradually as it varies in said first distinctive manner, second means including second differentiating circuit means being controlled to a distinctive condition to indicate the passage of a vehicle in the opposite direction when said rate of pulse transmission decreases relatively gradually as it varies in said second distinctive manner, and means controlled by said abrupt increase in rate of pulse transmission as said rate of pulse transmission varies in said second distinctive manner for controlling said first means to be nonresponsive for a limited time interval encompassing the interval of said abrupt increase in rate of pulse transmission.

11. The combination as defined in claim 10 and further including first speed registering means having the output of said first differentiating circuit means applied thereto only when said first means has been controlled to said distinctive condition and also including second speed registering means being connected to the output of said second differentiating circuit means only when said second means has been operated to said distinctive condition.

12. The system as defined in claim 10 and further including circuit means controlled by said first means in its operated condition to render said second means nonresponsive to the output of said converter means.

References Cited in the file of this patent

UNITED STATES PATENTS

| | | |
|---|---|---|
| 2,333,688 | Shepard | Nov. 9, 1943 |
| 2,400,309 | Kock | May 14, 1946 |
| 2,620,470 | Rather et al. | Dec. 2, 1952 |
| 2,965,893 | Barker | Dec. 20, 1960 |